United States Patent
Becker

(10) Patent No.: US 8,225,631 B2
(45) Date of Patent: Jul. 24, 2012

(54) HOOP LOCK

(75) Inventor: Thomas Becker, Hünfelden (DE)

(73) Assignee: ABUS August Bremicker Sohne KG (DE)

( * ) Notice: Subject to any disclaimer, the term of this patent is extended or adjusted under 35 U.S.C. 154(b) by 0 days.

(21) Appl. No.: 12/821,853

(22) Filed: Jun. 23, 2010

(65) Prior Publication Data
US 2011/0162416 A1  Jul. 7, 2011

(30) Foreign Application Priority Data
Jun. 23, 2009 (DE) .......... 10 2009 030 034

(51) Int. Cl.
  *E05B 67/06* (2006.01)
(52) U.S. Cl. ............ 70/53; 70/49; 70/54; 70/55; 70/416
(58) Field of Classification Search ........... 70/30, 49, 70/233, 53–55, 416, 417
  See application file for complete search history.

(56) References Cited

U.S. PATENT DOCUMENTS

| | | | | |
|---|---|---|---|---|
| 1,380,719 A * | 6/1921 | Johnson | | 70/49 |
| 1,380,720 A * | 6/1921 | Johnson | | 70/49 |
| 1,384,561 A * | 7/1921 | Hampton | | 70/49 |
| 1,539,301 A * | 5/1925 | Cooper | | 70/49 |
| 1,566,965 A * | 12/1925 | Johnson | | 70/260 |
| 3,435,642 A * | 4/1969 | Del Pesco | | 70/49 |
| 3,879,721 A * | 4/1975 | Yereance | | 70/441 |
| 3,933,015 A * | 1/1976 | Balicki | | 70/49 |
| 3,976,434 A * | 8/1976 | Shwayder | | 428/556 |
| 3,991,594 A * | 11/1976 | Goenner | | 70/30 |
| 4,226,100 A * | 10/1980 | Hampton et al. | | 70/51 |
| 4,719,773 A * | 1/1988 | Alberts | | 70/18 |
| 4,944,168 A * | 7/1990 | Kortenbrede | | 70/49 |
| 5,406,810 A * | 4/1995 | Chen | | 70/18 |
| 5,727,405 A * | 3/1998 | Cromwell | | 70/38 B |
| 5,752,416 A * | 5/1998 | Nien | | 74/551.8 |
| 5,896,762 A * | 4/1999 | Iidaka et al. | | 70/57.1 |
| 5,901,586 A * | 5/1999 | Hale | | 70/18 |
| 6,731,212 B2 * | 5/2004 | Hirose et al. | | 340/572.9 |
| 6,810,698 B2 * | 11/2004 | Weinraub | | 70/38 A |
| 7,251,965 B2 * | 8/2007 | Yu | | 70/21 |
| 7,631,524 B2 * | 12/2009 | Araujo | | 70/25 |
| 2004/0194515 A1 * | 10/2004 | Weinraub | | 70/49 |

(Continued)

FOREIGN PATENT DOCUMENTS

DE  3940686 A1  6/1991

(Continued)

OTHER PUBLICATIONS

German Search Report dated Mar. 30, 2010 and Translation thereof.

*Primary Examiner* — Suzanne Barrett
(74) *Attorney, Agent, or Firm* — Amster Rothstein & Ebenstein LLP

(57) ABSTRACT

The invention relates to a hoop lock for two wheelers, wherein the hoop lock has a lock body and a substantially U-shaped hoop. The hoop is selectively releasable from the lock body or latchable to the lock body. The hoop has at least two wire sections which extend along the U-shape of the hoop alongside one another, and which are surrounded, at least regionally, by a sleeve.

24 Claims, 5 Drawing Sheets

U.S. PATENT DOCUMENTS

| | | | |
|---|---|---|---|
| 2005/0092038 A1* | 5/2005 | Becker | 70/38 A |
| 2005/0183475 A1* | 8/2005 | Liu | 70/49 |
| 2008/0036596 A1 | 2/2008 | Auerbach et al. | |
| 2011/0154870 A1* | 6/2011 | Buhl et al. | 70/233 |

FOREIGN PATENT DOCUMENTS

| | | |
|---|---|---|
| DE | 19650347 A1 | 6/1998 |
| EP | 1558485 B1 | 11/2003 |
| JP | 2000204813 A | 7/2000 |

* cited by examiner

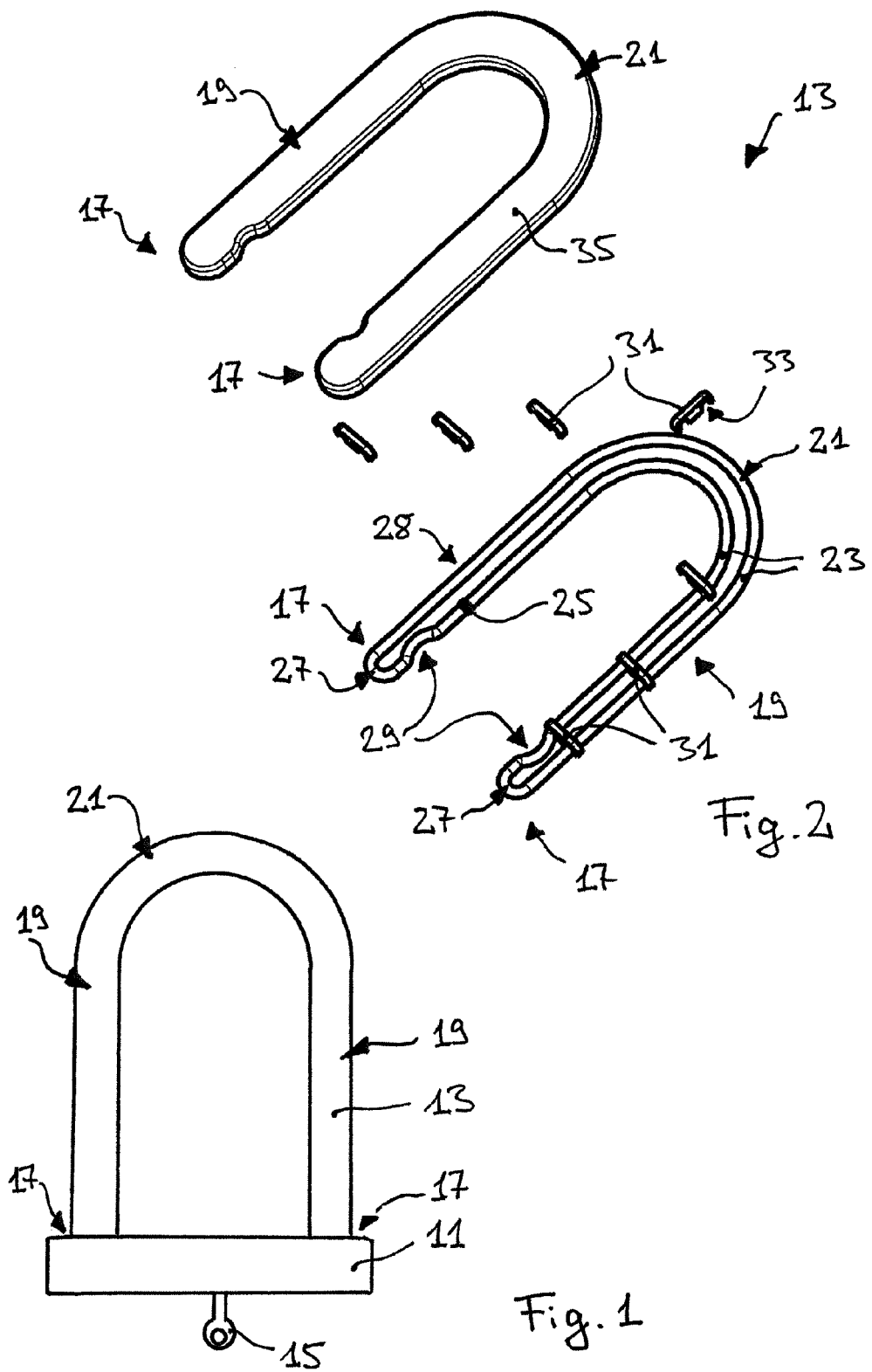

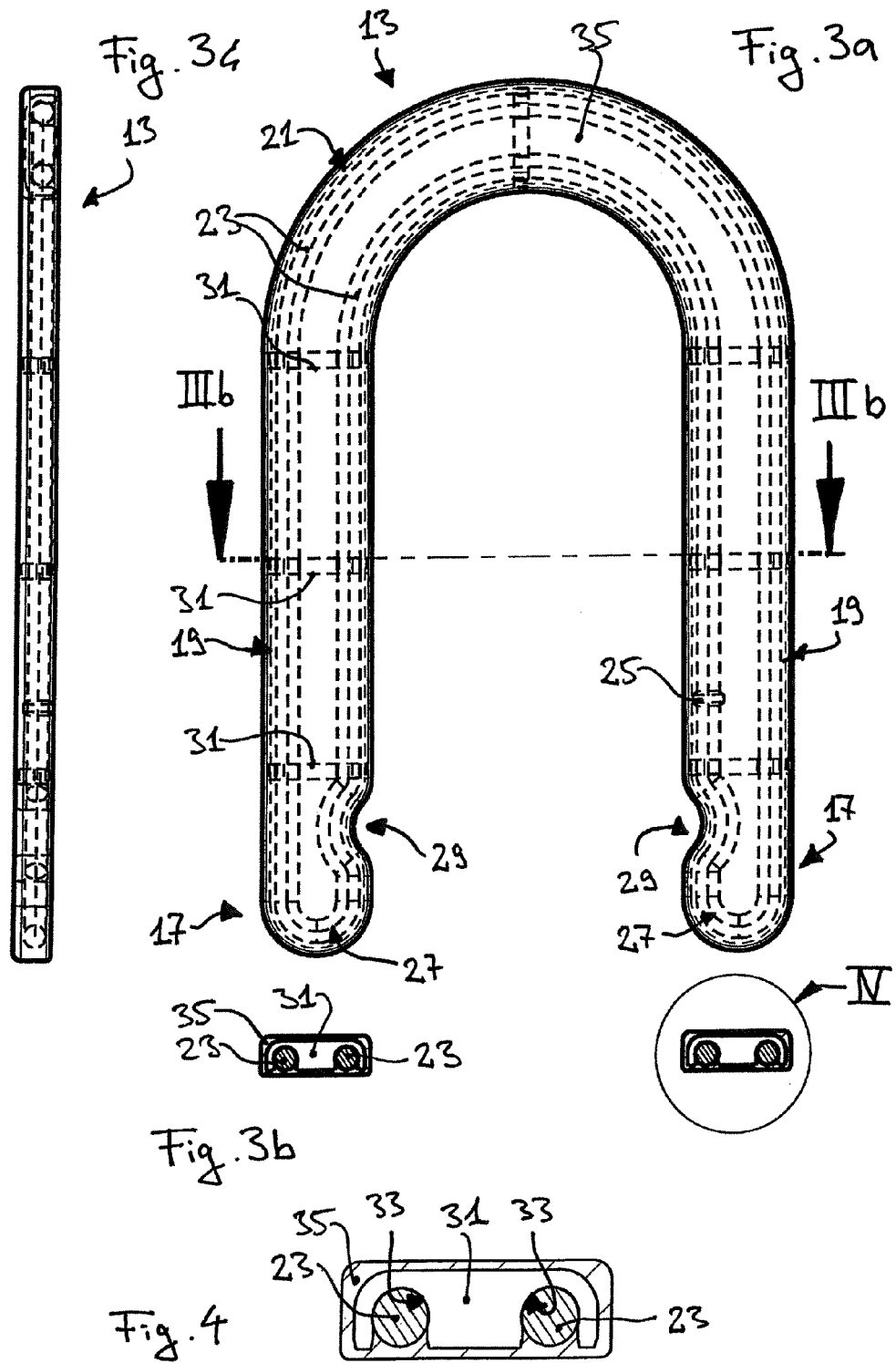

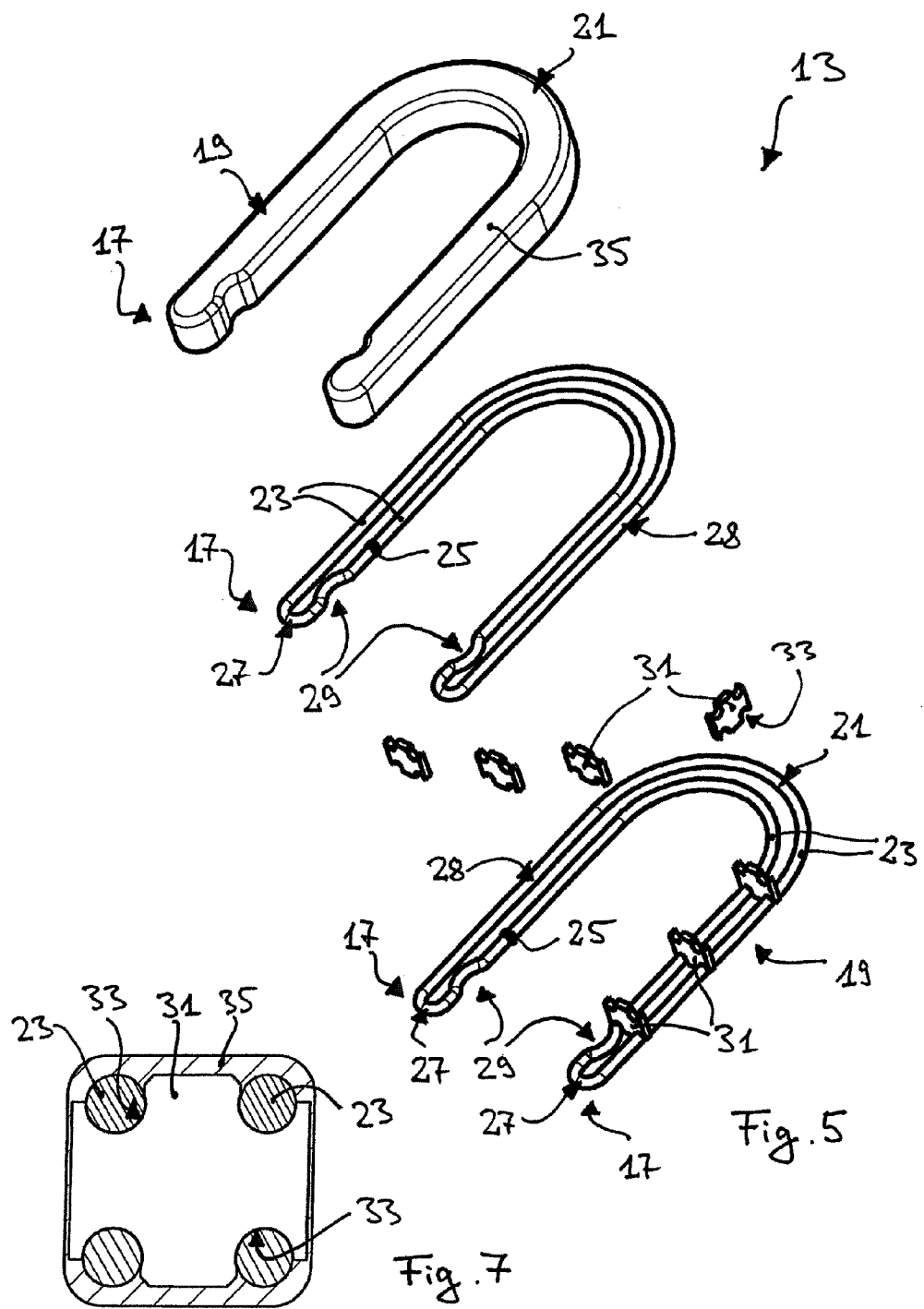

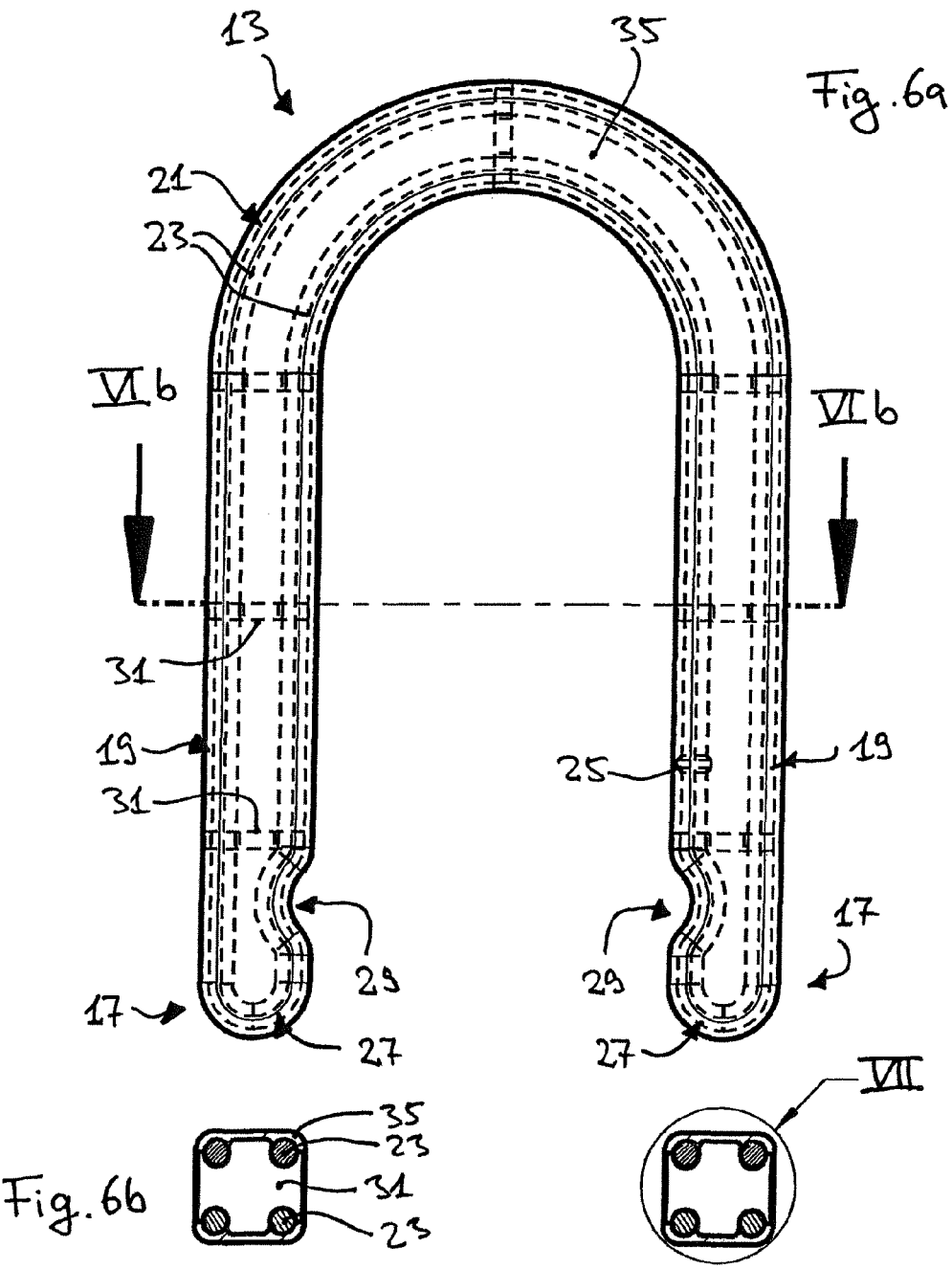

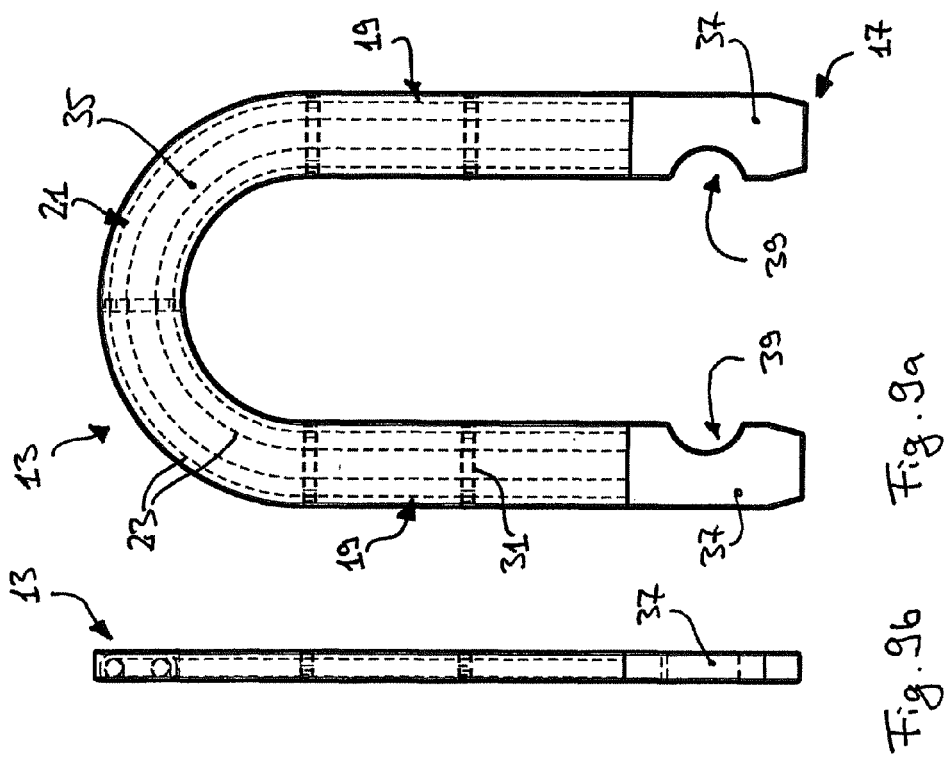
Fig. 9a
Fig. 9b
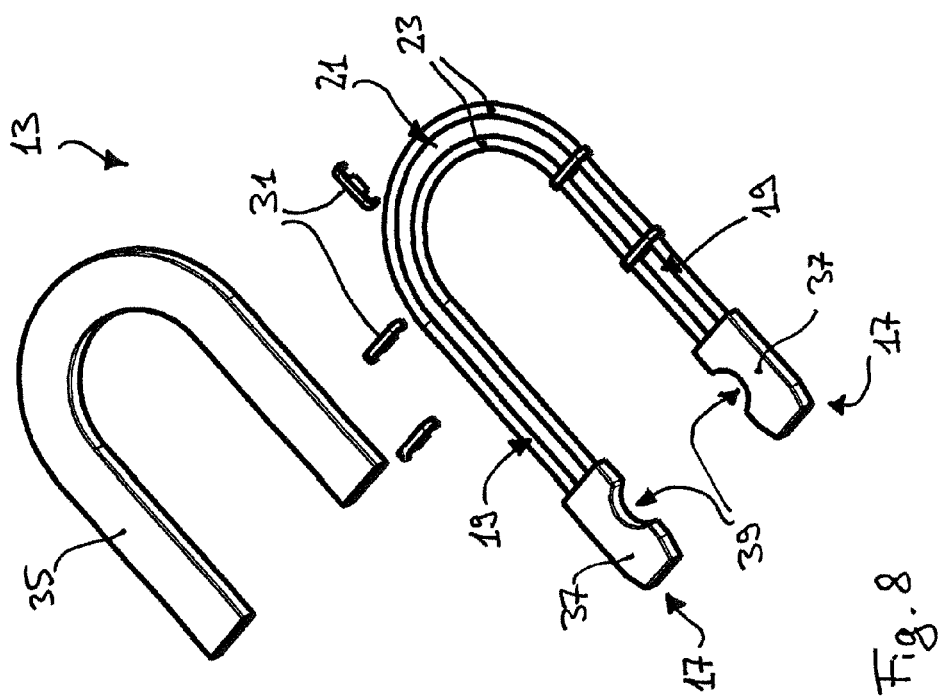
Fig. 8

HOOP LOCK

The invention relates to a hoop lock for bicycles, wherein the hoop lock has a lock body and a substantially U-shaped hoop. The hoop is selectively releasable from the locked body or latchable to the lock body.

A hoop lock of this kind serves to secure a two wheeler, in particular a bicycle or a motor cycle. For this purpose the lock body is normally provided with a latching device. In an unlatched position of the latching device the hoop can be released from the lock body in order to engage around a part of the two wheeler (for example a frame section) and a fixed object (for example a lamp post or a bicycle stand). Alternatively to this, the hoop simply accommodates a part of the two wheeler (for example the hoop is guided through the spokes of a wheel). Subsequently, the hoop is brought into engagement with the lock body and the latching device of the lock body is for example brought into the latch position by means of an associated key. Through this the hoop is secured to the lock body and the two wheeler is secured against an intentional use or removing.

Such locks for two wheelers should naturally be as safe as possible against being broken open. For this purpose it is known to form the hoop from a bent bar of solid metal. Such a massive construction is however associated with a correspondingly high weight.

A U-shaped hoop lock is known from EP 1 558 485 B1 in which the hoop has ceramic reinforcement elements which extend alongside one another and after one another along the U-shape of the hoop within a metal sleeve. A hoop lock of this kind is characterized by high security against being broken open and the use of ceramic reinforcing elements contributes to an advantageous reduction of weight. The manufacture of such a hoop lock is however undesirably complicated and the lock is correspondingly expensive.

It is an object of the invention to provide a hoop lock with a lock body and a U-shaped hoop which can be latched hereto which can be manufactured at favorable costs with a high security against being broken open and which has a low weight.

This object is satisfied by a hoop lock having the features of claim 1 and in particular in that the hoop has at least two wire sections extending along the U-shape of the hoop alongside one another and which are at least regionally surrounded by a sleeve.

In the hoop lock of the invention the hoop has a plurality of wire sections which extend alongside one another along the direction of the extent of the hoop, i.e. between the two hoop ends. The hoop thus does not consist of a single massive bent metal bar. In distinction to so-called cable locks, the hoop is however also not formed by a flexible braided wire rope instead the hoop has a plurality, for example two, three or four wire sections which are bent in accordance with the U-shape of the hoop. The wire sections with a sleeve jointly form a substantially rigid arrangement. The hoop is preferably exclusively formed from the wire sections, from the sleeve and optional the subsequently named spacers and/or fastener parts, with the sleeve in particular being formed from plastic.

A wire is generally understood to be a piece of metal manufactured by drawing. The wire sections are substantially rigid. In other words the wire sections are of stable shape even without the named sleeve, i.e. the wire can admittedly be bent in accordance with the U-shape of the hoop (with a correspondingly high expenditure of force), however it retains the bent form (inelastic deformation). The wire can have a round cross-section (round wire) or a cross-section with a multi-cornered shape, for example rectangular or hexagonal (for example manufactured by cold deformation of a round wire). In the hoop lock of the invention the cross-sectional diameter of the wire that is used is smaller than the cross-sectional diameter of the hoop formed by the wire sections and by the sleeve.

The invention is based on the recognition that a U-shaped hoop with adequately high security against being broken open can be formed already by the use of a plurality of wire sections arranged alongside one another, in particular when the wire sections that are used are hardened metal wires. A single wire section can namely already have a high resistance to clipping and sawing so that an arrangement of a plurality of wire sections adjacent to one another delivers an effective protection against unauthorized opening of the hoop loop. Through the additional use of a sleeve a structure can be provided which has a low weight in comparison to known U-shaped hoops and which enables comfortable handling for the user. Furthermore a hoop of this kind can be manufactured at favorable costs.

Advantageous embodiments of the invention will be named in the following and in the dependent claims.

In accordance with one embodiment wire sections extend along the U-shape of the hoop substantially parallel to one another. In this way the hoop can have a uniform cross-section along its U-shape and the manufacture of the hoop (bending of the wire sections; attachment of the sleeve; optionally the provision of spacers) proves to be particularly simple.

In accordance with a further embodiment the wire sections are arranged spaced apart from one another along a U-shape of the hoop. In this way an improved security against being broken open results because a tool for breaking open has to be used in sequence at different positions of the hoop.

In particular spacers can be provided between the wire sections of the hoop in order to stabilize the arrangement of the wire sections relative to one another or to simplify the manufacture of the hoop. The spacers can be provided as separate constructional elements when the spacers are formed integrally with the wire or integrally with the sleeve.

In accordance with a further embodiment the two named wire sections extend within a plane. In other words the wire sections are in this case bent such that they extend within a single plane. A particularly cost-favorable manufacture results by this since the bending tools that are used can be made correspondingly simply.

In accordance with a further embodiment at least one of the wire sections forms a constriction at least one end of the hoop for the reception of a latch element of the already explained latching device of the lock body. In this way the relevant wire section can thus form a recess of the hoop (either freely exposed or together with the sleeve) so that the hoop can be reliably secured to the lock body when the hoop is brought into engagement with the lock body and the latching device is brought into the latching position.

Alternatively or in addition to the provision of such a constriction the wire sections can be connected at least one of the two wire ends to a fastening part which serves to receive a latch element of a latching device of the lock body, for example by forming a suitable engagement recess. In this case the fastener part (for example metal) is thus provided separate from the named sleeve (for example plastic) in order to achieve a particularly stable seat with respect to the fixing of the hoop to the lock body. The wire sections can for example be welded to the fastener part, it can be cast into the fastener part, or can be held in form-locked manner by forming bent anchoring positions in the fastener part.

In accordance with a further embodiment the two named wire sections form a closed wire loop. In other words the two wire sections are connected together at the two hoop ends of a respective loop section. The loop section can in particular be freely exposed or surrounded by the named sleeve or be surrounded by the named fastener part. In this way the hoop is characterized by an improved security against being broken open, in particular if an attempt is made to drive a break-in tool (for example a chisel) into the intermediate space between the two wire sections in order to force the lock in this manner. In this embodiment the wire ends can for example be butt welded or welded in overlapping manner. The respective weld seam need not necessarily be provided at the named loop section of the closed wire loop (i.e. at one end of the hoop) but can rather be arranged at any desired position.

In accordance with a further embodiment four wire sections can be provided which extend alongside one another and in particular spaced apart from one another along the U-shape of the hoop. In this way a cross-sectional form of the hoop can be formed together with the sleeve which is significantly larger than the cross-sectional diameter of the single wire. Moreover, such a number of wire sections improves the security of the hoop lock against being broken open. Nevertheless, a significant weight reduction can be achieved in comparison to hoop locks with a solid metal bar as a hoop. In particular, if a material with a low density is used for the sleeve and/or if a hollow cavity is formed between the wire sections and the sleeve.

The hoop can in particular have two closed wire loops which extend along the U-shape of the hoop alongside one another in order to form cross-section four wire sections extending alongside one another. Spacers are preferably provided between the two closed wire loops.

Having regard to the named sleeve of the wire sections, they can have a plastic welding or a metal welding. In this way the hoop can be manufactured in a simple manner, in that the wire sections are first bent into the desired shape of the U-shaped hoop and are then provided with the named sleeve by an injection molding process.

Alternatively the sleeve can have a housing of plastic or metal. In particular the sleeve can be formed from a multi-part housing, for example consisting of two shells which are connected together. Connecting of the housing parts can for example take place by latching, by screwing them together, by pressing or by welding.

Furthermore it is preferred when at least one hollow cavity is formed between the wire sections and the sleeve of the U-shaped hoop. In this way a particularly significantly reduction of weight can be achieved and the hoop can have a large cross-section parameter in order to enable comfortable handling. A one-piece sleeve of plastic in the hollow cavity can for example be manufactured by an internal gas pressure injection molding process.

The invention will be explained in the following simply by way of example and with reference to the drawings.

FIG. 1 shows a schematic section of a U-shaped hoop lock,

FIG. 2 shows an exploded view of a U-shaped hoop in accordance with a first embodiment, FIGS. 3a, 3b and 3c respectively show a front view, a cross-sectional view and a side view of the hoop of FIG. 2, FIG. 4 shows an enlarged representation of the region IV in accordance with FIG. 3b, FIG. 5 shows an exploded view of a U-shaped hoop in accordance with a second embodiment, FIGS. 6a and 6b respectively show a front view and a cross-sectional view of the hoop of FIG. 5, FIG. 7 shows an enlarged representation of the region VII in accordance with FIG. 6b, FIG. 8 shows an exploded view of a U-shaped hoop in accordance with a further embodiment, FIGS. 9a and 9b respectively show a front view and a side view of the hoop of FIG. 8.

FIG. 1 shows a hoop lock for two wheelers having a lock body 11 and a substantially rigid U-shaped hoop 13, which can selectively be released from the lock body 11 or latched to the lock body 11. For this purpose the lock body 11 accommodates a latching device which is not shown in detail which can be actuated by means of a key 15. In the hoop lock of FIG. 1, the two ends 17 of the hoop 13 re inserted into suitable openings of the lock body 11. The hoop 13 has two mutually spaced apart limbs 19 which are directed parallel to one another. At the side remote from the hoop end 17 from the locked body 11 the limbs 19 are connected to one another via a U-shaped curved connection section 21.

FIGS. 2 to 4 show a first embodiment of a hoop 13 in accordance with FIG. 1. The hoop 13 has two wire sections 23 bent in a U-shaped manner which extend alongside one another, that is along the one limb 19, along the connection section 21 and along the other limb 19. In this connection the wire sections 23 extend spaced apart from one another and parallel to one another. The two wire sections 23 are formed by a single wire piece, for example of spring steel, with the two ends of this wire piece being butt welded together (weld seam 25). At the two hoop ends 17 of the two wire sections 23 merge into one another via a respective loop section 27 so that the two wire sections 23 jointly form a closed wire loop 28 which extends within a single plane and thus has a flat layout.

The two wire ends need not necessarily be welded together. Instead of this the two wire ends could also simply be arranged alongside one another i.e. with an intermediate space in order to form a substantially closed wire loop 28. The two wire ends can also be arranged overlapping (with or without a welded connection).

At the hoop ends 17 the inner wire section 23 has a respective constriction 29. The constrictions 29 serve to accommodate a latch element of a latching device when the hoop 13 is introduced into a lock body 11 and is latched to it (FIG. 1).

A plurality of spacers 31, for example of plastic or of metal serve to fix the two wire sections 23 relative to one another and to stabilize them. The spacers 31 can for example be plate-like shaped and have recesses 33 into which the wire sections 23 are inserted by forming a clamping seat or a latched seat (FIG. 4).

The hoop 13 in accordance with FIGS. 2 to 4 further has a sleeve 35 which is formed by a plastic molding and which completely surrounds the two wire sections 23 and the spacers 31. The hoop 13 thus has a substantially rectangular cross-section (FIG. 4).

The hoop 13 in accordance with FIGS. 2 to 4 has an advantageously low weight because the hoop 13 is not formed as a single solid metal bar but rather has two wire sections 23 which are surrounded by the comparatively light plastic sleeve 35. Nevertheless the hoop 13 has a high security against being broken open since wire sections 23 also have a high resistance to clipping and sawing. The security against being broken open is also further increased in the embodiment shown in that the two wire sections 23 extend spaced apart from one another and are posted within a solid plastic housing (sleeve 35). A forcing tool can thus not simply engage at the two wire sections 23 but must first overcome the intermediate space. Through the provision of a sleeve 35 the handling of the hoop 13 on release from the lock body 11 and on introduction into the lock body 11 (FIG. 1) is also simplified.

The FIGS. 5 to 7 show a second embodiment of a hoop 13 wherein similar elements as in the first embodiment of FIGS. 2 to 4 are characterized by the same reference numerals.

The important difference with respect to the first embodiment lies in the fact that the hoop 13 in accordance with FIGS. 5 to 7 has four wire sections 23 which are bent in U-shape and thus extend along the hoop 13 alongside one another. These four wire sections 23 formed pair-wise to two closed wire loops 28 which are arranged of said parallel to one another, i.e. the two wire loops 28 form two flat planes of extension which are parallel to one another and result in a substantially square cross-section of the hoop 13 (FIG. 7). In this embodiment spacers 31 are also provided which fix the wire sections 23 relative to one another and stabilize them. Furthermore the wire sections 23 are also surrounded in this embodiment by a sleeve 35 which is in particular formed by a plastic molding.

The hoop 13 in accordance with FIGS. 5 to 7 also has an advantageously low weight, in particular in comparison to a hoop which is made as a solid bent metal bar with the same cross-sectional dimensions. Through the use of four wire sections 23 which extend spaced apart alongside one another the security against being broken open is increased relative to the first embodiment of FIGS. 2 to 4.

FIGS. 8, 9a and 9b show a third embodiment of a hoop 13 with similar elements into the first and second embodiments in accordance with FIGS. 2 to 7 again being characterized by the same reference numerals.

The hoop 13 also has two wire sections 23 in this embodiment which extend along the U-shape of the hoop 13 alongside one another and which are surrounded along the hoop limb 19 and the connection section 21 by a sleeve 35 (preferably of plastic). A respective fastener part 37 is provided at the ends 17 of the hoop (for example of cast metal) which is formed separately from the wire section 23 and the sleeve 35. The fastening parts 37 are firmly connected to the wire sections 23. For example the wire section 23 can be cast into the fastener parts 37. The fastener part 37 facilitates accurately fitted introduction of the hoop end 17 to the associated openings of the lock body 11 (FIG. 1) and serve above all for the secure fixing of the hoop 13 to the lock body 11. For this purpose the fastener parts 37 have a respective engagement recess 39 to receive a latch element of a latching device of the lock body 11.

As a result of the formation the hoop 13 with two bent wire sections 23 and a light sleeve 35 the hoop 13 has a low weight. The fastener parts 37 nevertheless ensure a reliable latching to the lock body 11. Naturally in this embodiment (as in the second embodiment in accordance with FIGS. 5 to 7) four wire sections 23 can also be provided in order to form two flat planes of extent of the wire sections 23 parallel to one another and a substantially square cross-section of the hoop 13.

REFERENCE NUMERAL LIST 11 lock body
13 hoop
15 key
17 hoop end
19 hoop limb
21 connection section
23 wire section
25 weld seam
27 loop section
28 wire loop
29 constriction
31 spacer
33 recess
35 sleeve
37 fastener part
39 engagement recess

The invention claimed is:

1. Hoop lock for a two wheeler having a lock body and a substantially U-shaped hoop which is selectively releasable from the lock body or latchable to the lock body, wherein the hoop has at least two wire sections which extend along the U-shape of the hoop alongside one another, and which are surrounded, at least regionally, by a sleeve, and wherein the lock body has a longitudinal shape and the U-shaped hoop has two mutually spaced apart limbs which are directed parallel to one another and which are latched to the same longitudinal side of the lock body.

2. Hoop lock in accordance with claim 1, wherein the wire sections are bent in accordance with the U-shape of the hoop.

3. Hoop lock in accordance with claim 1, wherein the wire sections extend along the U-shape of the hoop, substantially parallel to one another.

4. Hoop lock in accordance with claim 1, wherein the wire sections extend along the U-shape of the hoop spaced apart from one another.

5. Hoop lock in accordance with claim 1, wherein spacers are provided between the two wire sections.

6. Hoop lock in accordance with claim 1, wherein the two wire sections extend within one plane.

7. Hoop lock in accordance with claim 1, wherein at least one of the wire sections has a constriction at at least one hoop end for the reception of a latch element of a latching device of the lock body.

8. Hoop lock in accordance with claim 1, wherein the wire sections are connected at least one hoop end to a fastening part for the reception of a latch element of a latching device of the lock body.

9. Hoop lock in accordance with claim 1, wherein the two wire sections form a substantially closed wire loop.

10. Hoop lock in accordance with claim 1, wherein the hoop has at least two substantially closed wire loops which extend along the U-shape of the hoop alongside one another.

11. Hoop lock in accordance with claim 10, wherein the two wire loops extend parallel to one another and are arranged spaced apart from one another.

12. Hoop lock in accordance with claim 1, wherein the wire sections are hardened and/or made of spring steel.

13. Hoop lock in accordance with claim 1, wherein the wire sections have a higher resistance to clipping and sawing than the sleeve.

14. Hoop lock in accordance with claim 1, wherein the wire sections are substantially rigid.

15. Hoop lock in accordance with claim 1, wherein the sleeve is formed by a plastic molding.

16. Hoop lock in accordance with claim 1, wherein the sleeve is formed from a multi-part housing of plastic.

17. Hoop lock in accordance with claim 1, wherein at least one hollow cavity is formed between the wire sections and the sleeve.

18. Hoop lock for a two wheeler having a lock body and a substantially U-shaped hoop which is selectively releasable from the lock body or latchable to the lock body, wherein the hoop has at least two wire sections which extend along the U-shape of the hoop alongside one another, and which are surrounded, at least regionally, by a sleeve, wherein at least one of the wire sections has a constriction at least one hoop end for the reception of a latch element of a latching device of the lock body.

19. Hoop lock for a two wheeler having a lock body and a substantially U-shaped hoop which is selectively releasable from the lock body or latchable to the lock body, wherein the hoop has at least two wire sections which extend along the U-shape of the hoop alongside one another, and which are surrounded, at least regionally, by a sleeve, wherein the two wire sections form a substantially closed wire loop.

20. Hoop lock for a two wheeler having a lock body and a substantially U-shaped hoop which is selectively releasable from the lock body or latchable to the lock body, wherein the hoop has at least two wire sections which extend along the U-shape of the hoop alongside one another, and which are surrounded, at least regionally, by a sleeve, wherein the hoop has at least two substantially closed wire loops which extend along the U-shape of the hoop alongside one another.

21. Hoop lock in accordance with claim 20, wherein the two wire loops extend parallel to one another and are arranged spaced apart from one another.

22. Hoop lock in accordance with claim 1, wherein the sleeve is plastic, and the hoop lock further comprises one or more spacers that fix the at least two wire sections relative to one another and fastening parts provided at ends of the hoop that receive a latch element of the lock body.

23. Hoop lock in accordance with claim 19 wherein the lock body has a longitudinal shape and the U-shaped hoop has two mutually spaced apart limbs which are directed parallel to one another and which are latched to the same longitudinal side of the lock body.

24. Hoop lock in accordance with claim 1, wherein the hoop is substantially rigid.

* * * * *

UNITED STATES PATENT AND TRADEMARK OFFICE
CERTIFICATE OF CORRECTION

| | | |
|---|---|---|
| PATENT NO. | : 8,225,631 B2 | Page 1 of 1 |
| APPLICATION NO. | : 12/821853 | |
| DATED | : July 24, 2012 | |
| INVENTOR(S) | : Thomas Becker | |

It is certified that error appears in the above-identified patent and that said Letters Patent is hereby corrected as shown below:

IN THE CLAIMS:

IN COLUMN 6, LINE 63, CLAIM 18:

"... constriction at least one hoop end ..."

should read

--... constriction at at least one hoop end ...--.

Signed and Sealed this
Sixth Day of November, 2012

David J. Kappos
*Director of the United States Patent and Trademark Office*